(12) United States Patent
Hirabayashi et al.

(10) Patent No.: US 11,958,600 B2
(45) Date of Patent: Apr. 16, 2024

(54) ROADABLE AIRCRAFT (71) Applicant: SUBARU CORPORATION, Tokyo (JP)

(72) Inventors: Daisuke Hirabayashi, Tokyo (JP); Keisuke Tajiri, Tokyo (JP); Yutaka Sasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/772,544

(22) PCT Filed: Nov. 2, 2020

(86) PCT No.: PCT/JP2020/041002
§ 371 (c)(1),
(2) Date: Apr. 28, 2022

(87) PCT Pub. No.: WO2021/090788
PCT Pub. Date: May 14, 2021

(65) Prior Publication Data
US 2022/0371728 A1 Nov. 24, 2022

(30) Foreign Application Priority Data
Nov. 6, 2019 (JP) ................. 2019-201141

(51) Int. Cl.
*B64C 37/00* (2006.01)
*B60F 5/02* (2006.01)
(Continued)

(52) U.S. Cl.
CPC ............... *B64C 37/00* (2013.01); *B60F 5/02* (2013.01); *B64C 1/1438* (2013.01); *B64C 3/56* (2013.01); *B64C 27/28* (2013.01); *B64C 29/0008* (2013.01)

(58) Field of Classification Search
None
See application file for complete search history.

(56) References Cited

U.S. PATENT DOCUMENTS 1,603,697 A * 10/1926 Klemm ..................... B64C 3/56
244/49
2,445,131 A * 7/1948 Wartian ................ B64C 1/1438
244/129.5
(Continued)

FOREIGN PATENT DOCUMENTS

CN 108146169 A * 6/2018 ................ B60F 5/02
CN 108146169 A 6/2018
(Continued)

OTHER PUBLICATIONS

International Preliminary Report on Patentability issued in corresponding International Patent Application No. PCT/JP2020/041002, dated May 10, 2022, with English translation.
(Continued)

*Primary Examiner* — Richard Green
*Assistant Examiner* — Nevena Aleksic
(74) *Attorney, Agent, or Firm* — Rimon P.C.

(57) ABSTRACT

A roadable vehicle includes main wings, a fuselage, a sliding door on a lateral side surface of the fuselage, and hinge mechanisms. The hinge mechanisms connect the main wings to the fuselage. The hinge mechanisms allow the main wings to turn between a first state where the main wings are folded beside the fuselage and a second state where the main wings are opened on the lateral sides of the fuselage. In the first state, the sliding door is opened and closed by sliding the sliding door in a space formed between one of the main wings and the fuselage while an outer side of the fuselage and an inner side of the sliding door facing each other.

4 Claims, 8 Drawing Sheets

(51) Int. Cl.
*B64C 1/14* (2006.01)
*B64C 3/56* (2006.01)
*B64C 27/28* (2006.01)
*B64C 29/00* (2006.01)

(56) References Cited

U.S. PATENT DOCUMENTS

| | | | | |
|---|---|---|---|---|
| 2,674,422 | A * | 4/1954 | Pellarini | B64C 3/56 |
| | | | | 244/49 |
| 3,131,892 | A * | 5/1964 | Salmun | B64C 27/04 |
| | | | | 49/40 |
| 6,082,665 | A | 7/2000 | Spitzer | |
| 10,435,138 | B2 * | 10/2019 | Gionta | B64C 3/56 |
| 2011/0036938 | A1 * | 2/2011 | Blomeley | B64C 11/00 |
| | | | | 244/65 |
| 2017/0210469 | A1 | 7/2017 | Piasecki et al. | |
| 2019/0084664 | A1 * | 3/2019 | Nesti | B64D 5/00 |
| 2020/0277051 | A1 * | 9/2020 | Petrov | B64C 27/26 |
| 2021/0001973 | A1 * | 1/2021 | Witt | B60V 1/08 |
| 2022/0097837 | A1 * | 3/2022 | Mehrgan | B64C 29/0033 |

FOREIGN PATENT DOCUMENTS

| | | |
|---|---|---|
| DE | 10 2016 206 551 A1 | 10/2017 |
| DE | 10-2016-20655 A | 10/2017 |
| DE | 10 2017 006 828 A1 | 2/2018 |
| DE | 10-2017-006828 A | 2/2018 |
| JP | 61-196899 U | 12/1986 |
| JP | 2011-225058 A | 11/2011 |
| JP | 2013-244898 A | 12/2013 |
| JP | 2017-185866 A | 10/2017 |

OTHER PUBLICATIONS

English Translation of the Written Opinion of the International Searching Authority issued in corresponding International Patent Application No. PCT/JP2020041002, dated May 10, 2022.
Bauer, Claudia, "Passenger drone technology and flying cars", blog, Alphabet, Apr. 16, 2019, available at https://www.alphabet.com/en-ww/blog/passenger-drone-technology-and-flying-cars.
International Search Report issued in corresponding International Patent Application No. PCT/JP2020/041002, dated Jan. 19, 2021.
Bauer, Claudia , "Passenger drone technology and flying cars", Passenger drone technology and flying cars in Claudia Bauer, LinkedIn, 2019, 04 months, [online], [retrieved on Jan. 16, 2023], Retrieved from the Internet: <URL: https://www.linkedin.com/pulse/passenger - drone- technology flying-wagon-bauer - bauer].
Japanese Notice of Reasons for Refusal issued in corresponding Japanese Patent Application No. 2021-554930, dated Jan. 24, 2023, with English translation.

* cited by examiner

ROADABLE AIRCRAFT

CROSS REFERENCE TO RELATED APPLICATIONS

This application is the U.S. National Phase under 35 US.C. § 371 of International Application No. PCT/JP2020/041002, filed on Nov. 2, 2020, which claims the benefit of Japanese Application No. 2019-201141, filed on Nov. 6, 2019, the entire contents of each are hereby incorporated by reference.

TECHNICAL FIELD

The present invention relates to a roadable aircraft.

BACKGROUND ART

Roadable aircrafts which are equipped with main wings and which can travel on the ground and fly in the air have been studied and developed (see, for example, Patent Literatures 1-3).

When these roadable aircrafts travel on the ground, the main wings are folded downward, for example.

As an example of so-called ultralight planes, some proposed roadable aircrafts (see Patent Literature 4) can turn their main wings between:
- a state where the main wings are folded beside the fuselage; and
- a state where the main wings are opened on lateral sides of the fuselage.

CITATION LIST

Patent Literature

Patent Literature 1: JP 2011-225058 A
Patent Literature 2: JP 2013-244898 A
Patent Literature 3: JP 2017-185866 A
Patent Literature 4: JP S61-196899 U

SUMMARY OF INVENTION

Technical Problem

If the configuration of the main wings described in Patent Literature 4 is applied to roadable aircrafts described in Patent Literatures 1-3, etc., the main wings are immediately outside a door in the fuselage of the roadable aircraft when the main wings are folded beside the fuselage.

Therefore, if the door is a so-called hinged door, the door will hit the wing when a driver in the roadable aircraft opens the door to get out. The driver may not be able to open the door, or the door or wing may break.

The present invention was made in view of the above. An object of the present invention is to provide a roadable aircraft in which a door can be opened and closed without interfering with the main wing while main wings are folded beside the fuselage.

Solution to Problem

To solve the above problem, a roadable aircraft according to an aspect of the invention includes:
- main wings;
- a fuselage;
- a sliding door on a lateral side of the fuselage; and
- hinge mechanisms which connect the main wings to the fuselage and which allow the main wings to turn between:
  - a first state where the main wings are folded beside the fuselage; and
  - a second state where the main wings are opened on lateral sides of the fuselage, wherein, in the first state, the sliding door is opened and closed by sliding the sliding door in a space formed between the main wing and the fuselage while an outer side of the fuselage and an inner side of the sliding door face each other.

Advantageous Effects of Invention

According to the invention, in a roadable aircraft equipped with main wings and capable of traveling on the ground and flying in the air, a door can be opened and closed without interfering with the wings while the wings are folded beside the fuselage (first state).

BRIEF DESCRIPTION OF DRAWINGS

FIG. 10 shows rails, a sliding door, etc. in FIG. 9 viewed from above.

DESCRIPTION OF EMBODIMENTS

Embodiments of a roadable aircraft of the invention will be described with reference to the drawings.

In the following description, the vertical, front/rear, and right/left directions are the respective directions of the roadable aircraft.

Overall Configuration of Roadable Aircraft

Figure 1:
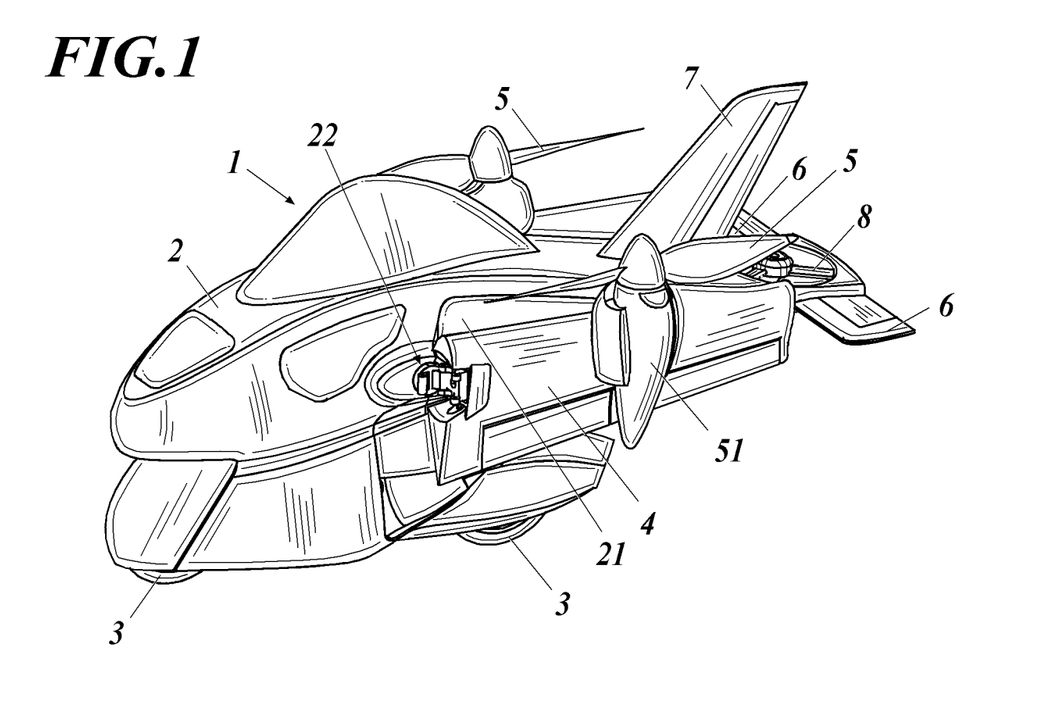
FIG. 1 shows a configuration of a roadable aircraft of an embodiment during ground travel.
Figure 2:
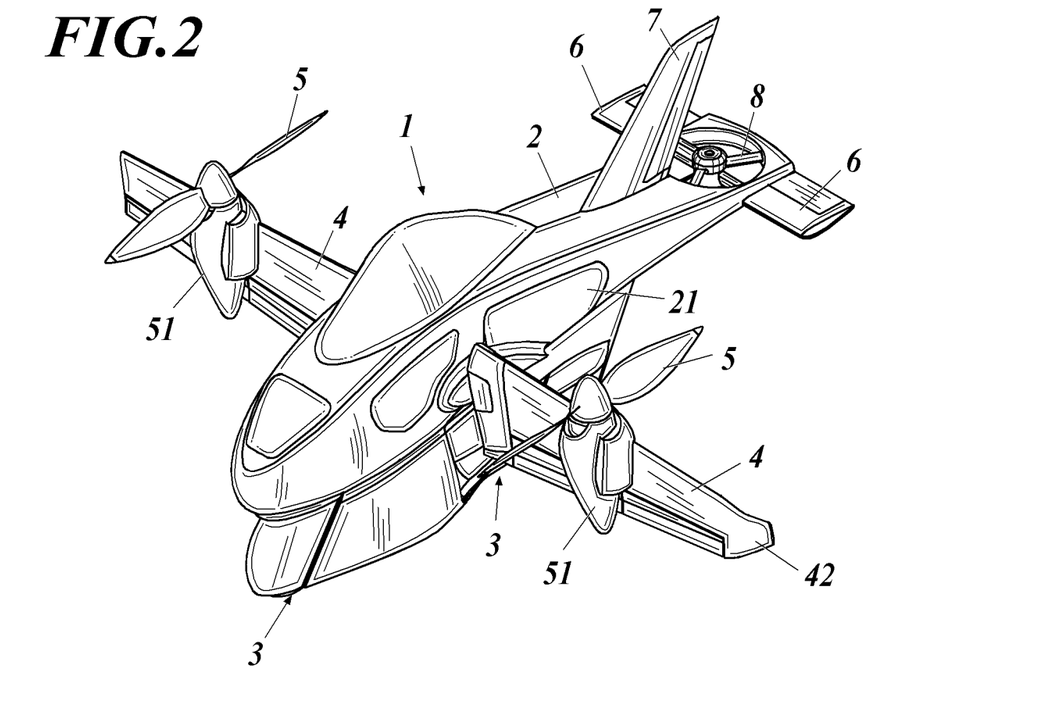
FIG. 2 shows a configuration of the roadable aircraft of the embodiment during takeoff and landing.
Figure 3:
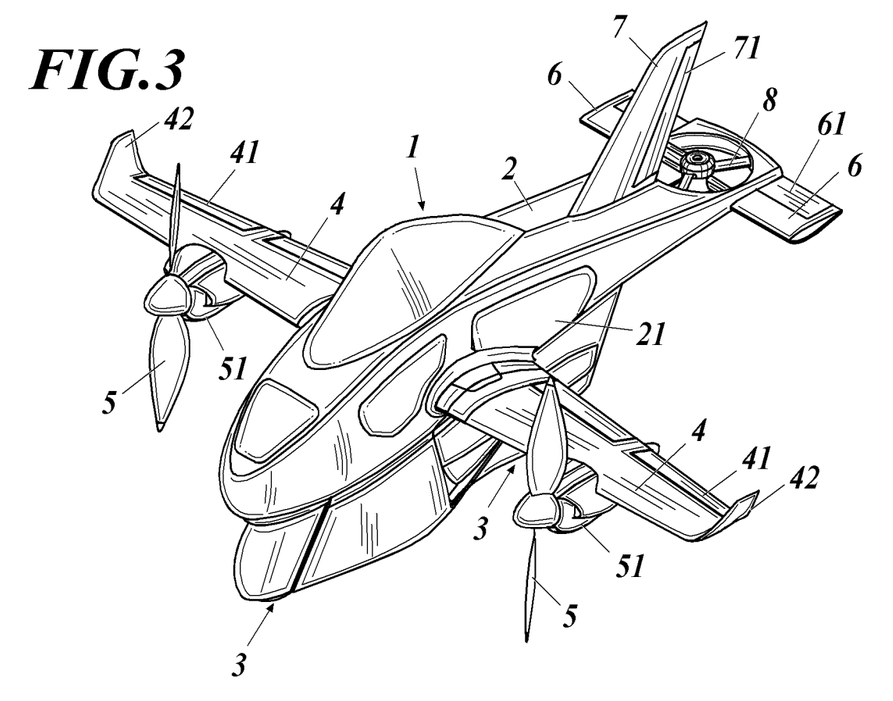
FIG. 3 shows a configuration of the roadable aircraft in cruise.

A roadable aircraft 1 of an embodiment can travel on the ground and can also fly in the air. FIG. 1 shows a configuration of the roadable aircraft of the embodiment during ground travel. FIG. 2 shows a configuration during takeoff and landing in flight. FIG. 3 shows a configuration during cruise in flight.

The roadable aircraft 1 mainly includes a fuselage 2, wheels 3, main wings 4, propellers 5, horizontal stabilizers 6, a vertical stabilizer 7, a tail rotor 8, and hinge mechanisms 22.

In this embodiment, the roadable aircraft 1 is based on an automatic motorcycle. Two wheels 3 in front and behind are provided below the fuselage 2. The number of wheels of the roadable aircraft 1 may be three, four, etc.

Although not shown in figures, the cockpit, located at the substantial center of the fuselage 2, is equipped with a steering wheel and steps, similar to a steering wheel and steps of an automatic motorcycle. A driver straddling the seat operates the steering wheel and steps to control the aircraft on the ground and in flight.

An engine, a generator, a battery, etc. are built into the fuselage 2 of the embodiment although they are not shown in figures. The roadable aircraft 1 is powered by the engine when traveling on the ground.

Figure 4:
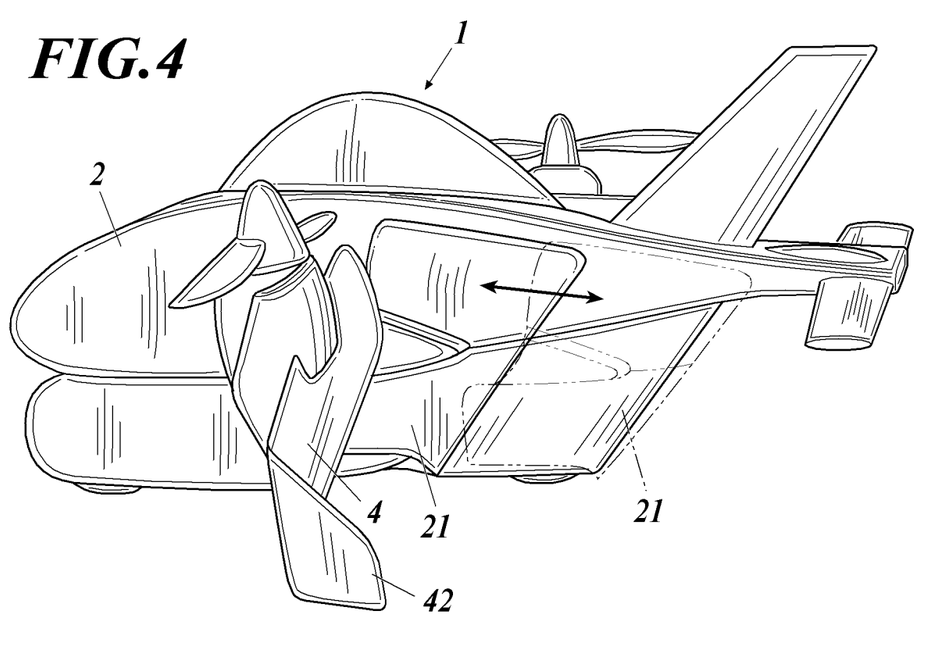
FIG. 4 shows that a sliding door can be opened and closed by sliding the door back and forth along a lateral side of the fuselage.

A sliding door 21 is provided on a lateral side of the fuselage 2 of the roadable aircraft 1. As shown in FIG. 4, the sliding door 21 is opened and closed by sliding it back and forth along the lateral side of the fuselage 2 while the outer side of the fuselage 2 and the inner side the sliding door 21 face each other.

The main wing 4 is a tilt wing with a propeller 5 attached. The main wings 4 are connected to the fuselage 2 via the hinge mechanisms 22.

The hinge mechanism 22 can rotate the main wing 4 between:
  a state where the main wing 4 is folded beside the fuselage 2 (see FIG. 1); and
  a state where the main wing 4 is opened on a lateral side of the fuselage 2 (see FIG. 2).

By rotating a part of the hinge mechanism 22 on a side of the fuselage 2, the tilt angle of the main wing 4 can be changed between:
  a state where the propeller 5 faces upward (see FIG. 2); and
  a state where the propeller 5 faces forward (see FIG. 3).

The propeller 5 is attached to the main wing 4 and is driven by an electric motor (not shown) housed in a nacelle 51.

In this embodiment, the tail rotor 8 is provided at the rear of the roadable aircraft 1, i.e., at the part of the fuselage 2 behind the vertical stabilizer 7 between the right and left horizontal stabilizers 6. The rotation axis of the tail rotor 8 substantially aligns with the vertical direction. The tail rotor 8 is also driven by electric motors (not shown).

The fuselage 2, etc. also houses an ECU, various measuring instruments, sensors, various instruments related to braking, etc. which are usually installed in motorcycles.

The fuselage 2, etc. houses a computer, etc. as well as various measuring instruments, sensors, etc. which are installed in aircrafts. During flight, the computer, etc. control the speed of the propellers 5, the tilt angle of the main wings 4, and moving surfaces such as ailerons 41, elevators 61, and a rudder 71 (see FIG. 3), etc.

Change in Form of Roadable Aircraft, and So On

Change in the form of the roadable aircraft 1 of the embodiment, etc. will be explained.

To get in the roadable aircraft 1 of the embodiment for ground travel, a driver turns one of the right and left main wings 4 in the opening direction (while the propeller 5 faces upward) from the state shown in FIG. 1. The driver slides the sliding door 21 on a lateral side of the fuselage 2 open, and gets into the cockpit. The driver sits astride the seat. The driver turns the main wing 4 in the closing direction and slides the sliding door 21 to close it.

To get out of the roadable aircraft 1 after ground travel, the driver opens the sliding door 21 on the right or left side, and turns the main wing 4 in the opening direction.

The driver gets off the seat. The driver closes the sliding door 21 and turns the main wing 4 to close it.

To fly on the roadable aircraft 1 of the embodiment, the driver fixes the right and left main wings 4 in the open state with the propeller 5 facing upward as shown in FIG. 2. The driver gets in and out by opening and closing the sliding door 21 on the lateral side of the fuselage 2.

The roadable aircraft 1 of the embodiment changes its form during flight.

During takeoff, the roadable aircraft 1 rises vertically with the propellers 5 facing upward. When landing, the roadable aircraft 1 descends vertically with the propellers 5 facing upward.

The roadable aircraft 1 takes off with the propellers 5 facing upward as described above, and then tilts the right and left main wings 4 forward to fly forward.

Rotation of a part of the hinge mechanism 22 on the fuselage 2 side can change the tilt angle of the main wing 4 to several levels between the state shown in FIG. 2 and the state shown in FIG. 3. The flight speed of the roadable aircraft 1 can be changed by changing the tilt angle of the main wings 4.

Configuration to Enable Opening and Closing of Sliding Door and So On

As described above, according to the roadable aircraft 1 of the embodiment, to get in and out of the roadable aircraft 1 for ground travel, the driver opens and closes the sliding door 21 while the main wings 4 are folded beside the fuselage (see FIG. 1).

If the door of the roadable aircraft 1 is a so-called hinged door, when the driver in the roadable aircraft 1 opens the door to get out, the door hits the folded wing 4 as mentioned above. The door could not be opened or the main wing 4 could be broken.

In this respect, according to the embodiment, since the door of the roadable aircraft 1 is the sliding door 21 as described above, the sliding door 21 can be opened and closed without hitting the folded wing 4.

While the main wings 4 are folded beside the fuselage 2 as shown in FIG. 1, a space S is formed between the main wing 4 and the fuselage 2 (the space is represented by the sign S in, for example, FIGS. 5 and 7, which will be mentioned below). The space S allows the sliding door 21 on the lateral side of the fuselage 2 to open and close.

In the space S formed between the main wings 4 and the fuselage 2 while the main wings 4 are folded beside the fuselage 2, the sliding door 21 on the lateral side of the fuselage 2 can be opened and closed by sliding the sliding door 21 while the outer side of the fuselage 2 and the inner side of the sliding door 21 face each other.

By sliding the sliding door 21 within the space S formed between the folded main wing 4 and the fuselage 2, the sliding door 21 can be opened and closed without interfering with the main wing 4 while the main wing is folded beside the fuselage 2.

Configuration, etc. for forming a space between the fuselage 2 and the main wing 4 folded beside the fuselage 2 to allow the sliding door 21 to open and close will be specifically described with several examples.

First Embodiment

For example, as shown in FIG. 3, etc., the ends of the main wings 4 of the roadable aircraft 1 are bent upward in the state where the main wings 4 are opened on the lateral sides of the fuselage 2. This forms winglets 42.

Figure 5:
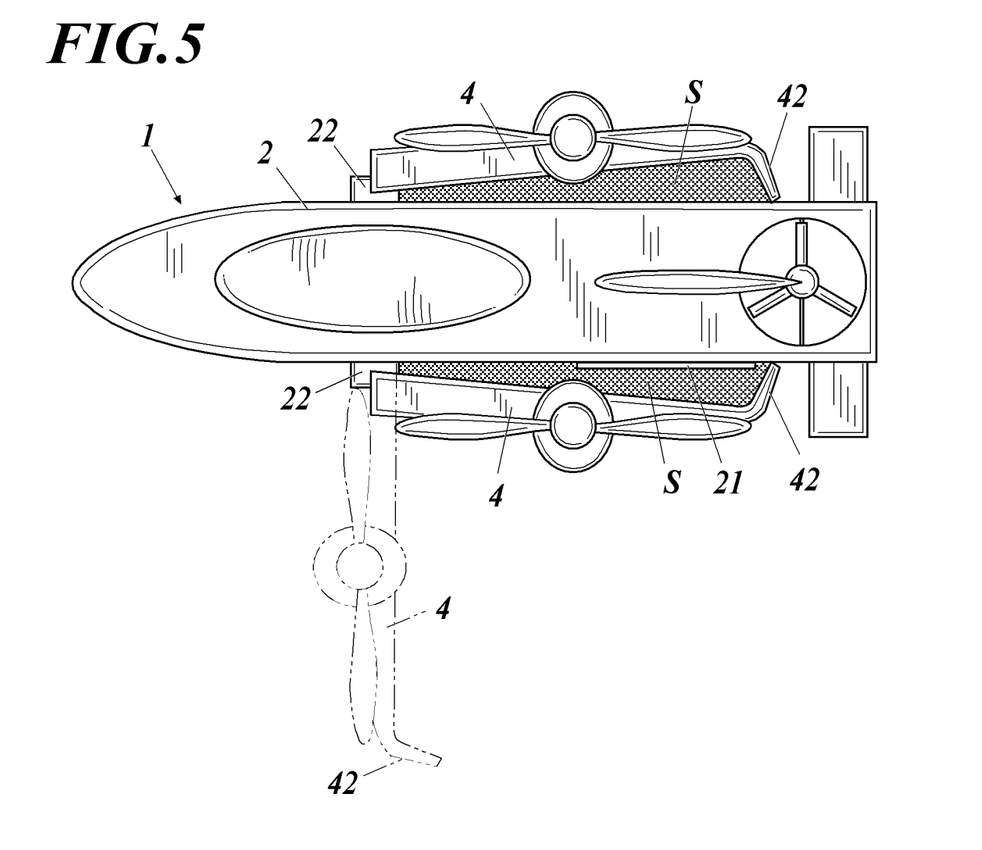
FIG. 5 is a plan view of the roadable aircraft of the first embodiment with main wings folded beside the fuselage.

As shown in FIG. 5, when the main wing 4 is folded beside the fuselage 2, the space S (hatched area in the figure) surrounded by the fuselage 2, the main wing 4, and the winglet 42 is formed. The space S allows the sliding door 21 on the lateral side of the fuselage 2 to open and close. FIG. 5 shows the sliding door 21 being opened.

According to this configuration, the sliding door 21 can be opened and closed within the space S while the main wing 4 is folded beside the fuselage 2. The sliding door 21 can be opened and closed without interfering with the main wing 4.

Therefore, when the driver opens and closes the sliding door 21 to get in and out of the roadable aircraft 1 of the embodiment, the main wing 4, which is folded beside the fuselage 2, is prevented from hitting or scraping against the sliding door 21. The sliding door 21 and the main wing 4 are prevented from being damaged.

According to the embodiment, the propeller 5 and the nacelle 51, which contains the electric motor, etc., are attached to the main wing 4 as mentioned above. The propeller 5 and the nacelle 51 are heavy. When the main wings 4 are folded beside the fuselage 2 (see FIG. 1), the hinge mechanism 22 supports the weight of the main wing 4 including the propeller 5 and the nacelle 51. When the roadable aircraft 1 travels on the ground in this state, the main wing 4 including the propeller 5 and the nacelle 51 swings around the hinge mechanism 22 due to unevenness of a road surface, etc.

Therefore, if the main wing 4 folded beside the fuselage 2 is supported only by the hinge mechanism 22, the load is concentrated on the hinge mechanism 22. The hinge mechanism 22 could be damaged or destroyed.

In view of this, the tip of the winglet 42 may be fixable to the fuselage 2 while the main wing 4 is folded beside the fuselage 2 as described above.

According to this configuration, the heavy main wing 4 (including the propeller 5 and the nacelle 51) can be fixed to the fuselage 2 at two locations, i.e., at the hinge mechanism 22 and the end of the winglet 42. The load on the hinge mechanism 22 is reduced. The hinge mechanism 22 is prevented from being damaged or destroyed.

Figure 6A:
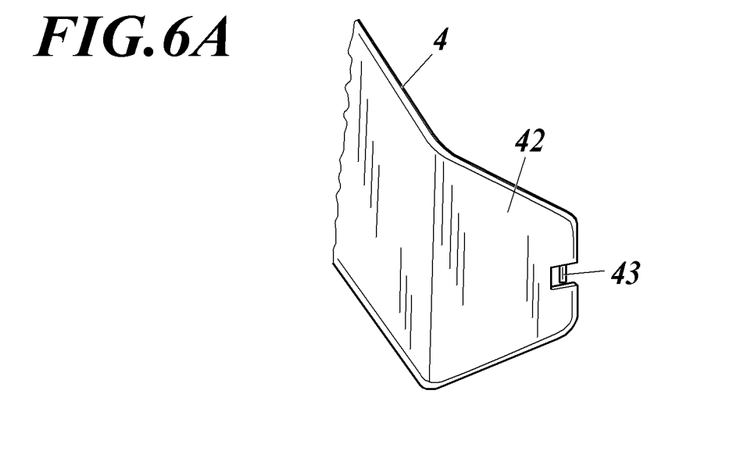
FIG. 6A shows an example of a hook provided at the end of a winglet.
Figure 6B:
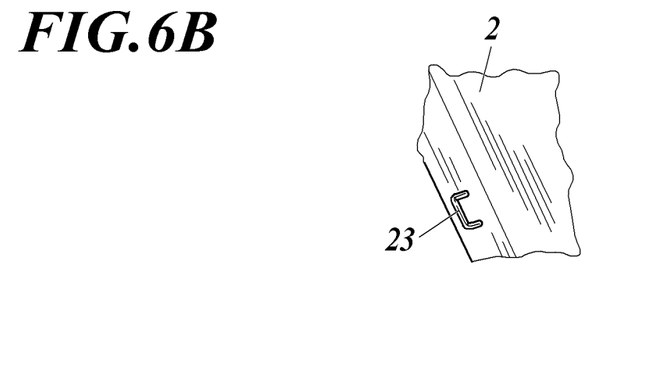
FIG. 6B shows an example of a metal fitting attached to a lateral side of the fuselage of the roadable aircraft.

As a method of fixing the end of the winglet 42 of the main wing 4 to the fuselage 2, for example, a hook 43 is provided at the end of the winglet 42 as shown in FIG. 6A. As shown in FIG. 6B, a U-shaped metal fitting 23 for engagement is attached to the lateral side of the fuselage 2 of the roadable aircraft 1.

When the main wing 4 is folded beside the fuselage 2, the end of the winglet 42 is fixed to the fuselage 2 by engaging the hook 43 with the fitting 23.

In this case, for example, a handle (not shown in figures) for moving the hook 43 is provided in the main wing 4. The driver can insert his/her hand into the main wing 4 from either the top or bottom side of the wing 4 to operate the handle.

For example, the handle is connected to the hook 43 inside the main wing 4 by a wire or a link. The hook 43 can be moved up and down by operating the handle. Engagement between hook 43 and the fitting 23 is released by moving the hook 43 upward. The hook 43 is engaged with the fitting 23 by moving hook 43 downward.

According to this configuration, to get in the roadable aircraft 1, the driver inserts his/her hand from the underside of the main wing 4, which faces the outside of the roadable aircraft 1. The driver operates the handle to move the hook 43 to disengage it from the fitting 23. The driver opens the main wing 4 on the lateral side of the fuselage 2. The driver opens the sliding door 21 and gets into the cockpit.

To get out of the roadable aircraft 1, the driver opens the sliding door 21 and insert his/her hand from the upper side of the main wing 4 which faces the fuselage 2 side of the roadable aircraft 1. The driver operates the handle to move the hook 43 to disengage it from the fitting 23. The driver opens the main wing 4 on the lateral side of the fuselage 2, and gets out of the cockpit.

The operation of disengagement of the hook 43 from the fitting 23 by the driver to get out of the roadable aircraft 1 may be done in the cockpit instead of being done by the handle on the main wing 4.

The hook 43 may be moved electromagnetically instead of being moved mechanically by a wire, a link, etc.

In order to prevent a notch for the hook 43 on the end of the winglet 42 of the main wing 4, a hole for operating the handle, etc. from affecting aerodynamics of the main wing 4, etc., these notch, hole, etc. may be closed except when the hook 43 is engaged with the fittings 23 or when the handle is operated.

The fitting 23 may be able to be brought outward from the lateral side of the fuselage 2 and be housed inside the lateral side of the fuselage 2.

Second Embodiment

Figure 7:
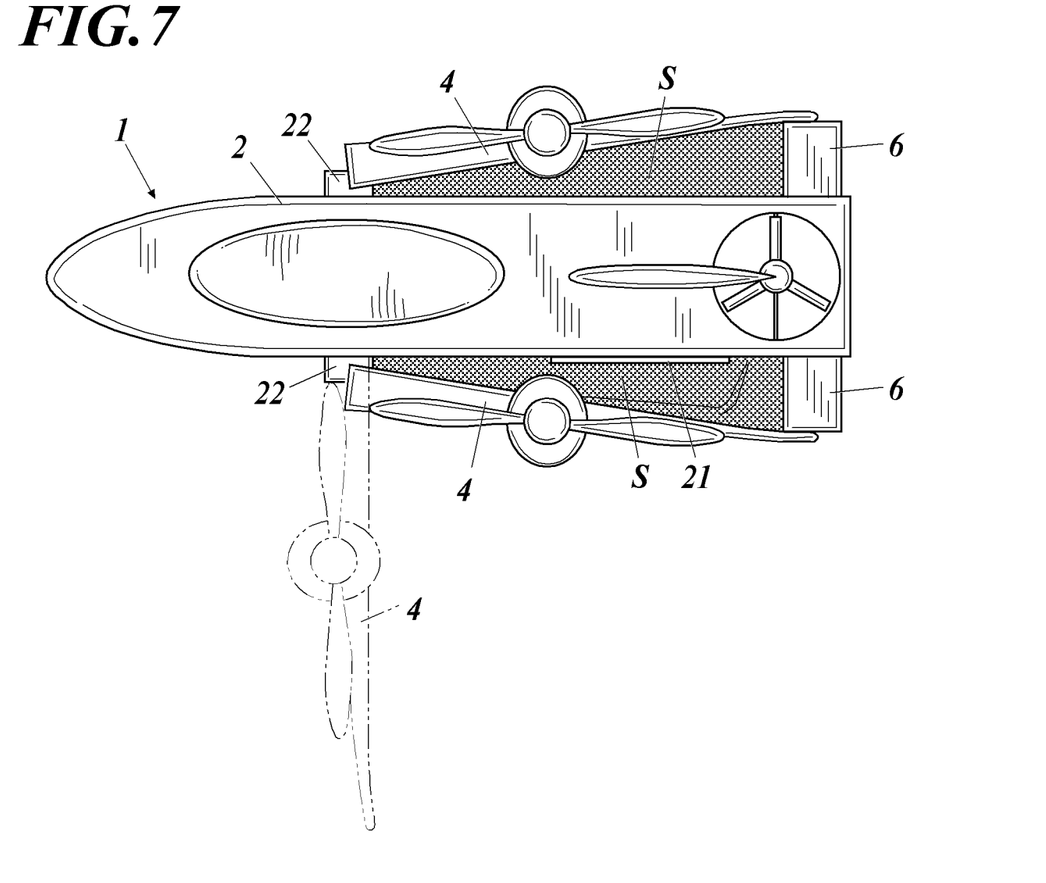
FIG. 7 is a plan view of a roadable aircraft of the second embodiment with main wings folded beside the fuselage.

As shown in FIG. 7, the main wings 4 of the roadable aircraft 1 may be such long that the ends of the main wings 4 touch the horizontal stabilizers 6 when the main wings 4 are folded beside the fuselage 2. In this case, winglets may not be formed in the main wings 4.

In this case, when the main wing 4 is folded beside the fuselage 2, a space S (hatched in the figure) surrounded by the fuselage 2, the main wing 4, and the horizontal stabilizer 6 is formed. FIG. 7 shows the sliding door 21 being opened.

According to this configuration, the sliding door 21 can be opened and closed within the space S while the main wing 4 is folded beside the fuselage 2. The sliding door 21 can be opened and closed without interfering with the main wing 4.

Therefore, when the driver opens and closes the sliding door 21 to get in and out of the roadable aircraft 1 of the embodiment, the main wing 4, which is folded beside the fuselage 2, is prevented from hitting or scraping against the sliding door 21. The sliding door 21 and the main wing 4 are prevented from being damaged.

Also in this embodiment, the ends of the main wings 4 may be fixable to the horizontal stabilizer 6 while the main wings 4 are folded beside the fuselage 2. For example, a hook is provided at the end of the main wing 4, and a metal fitting is attached to the end of the horizontal stabilizer 6 for engagement with the hook (not shown in figures).

According to this configuration, two portions of the heavy main wing 4 (including the propeller 5 and the nacelle 51), i.e., the hinge mechanism 22 and the end of the main wing 4, can be fixed to the fuselage 2 and the horizontal stabilizer 6. This reduces the load on the hinge mechanism 22. The hinge mechanism 22 is prevented from being damaged or destroyed.

How to Slide Sliding Door

As described above, the door of the roadable aircraft 1 is the sliding door 21. The space S is formed between the folded main wing 4 and the fuselage 2, and the sliding door 21 is opened and closed within the space S. This allows the sliding door 21 to open and close without interfering with the main wing 4 while the main wing 4 is folded beside the fuselage 2.

Figure 8A:
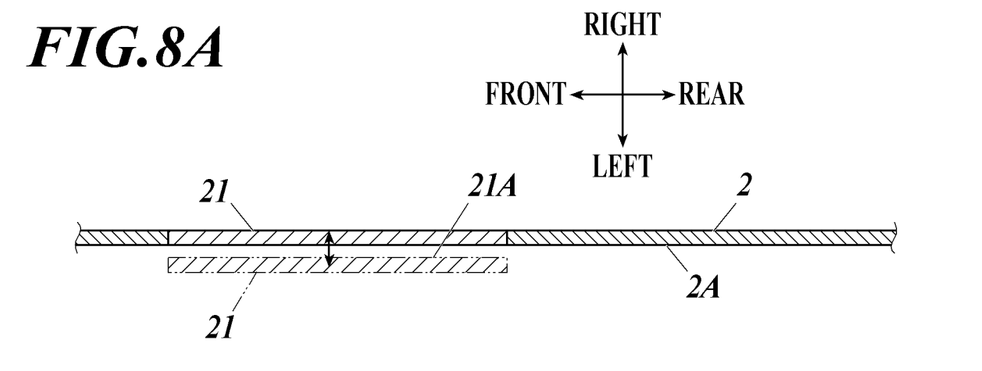
FIG. 8A shows a sliding door pulled outward from a lateral side of the fuselage.
Figure 8B:
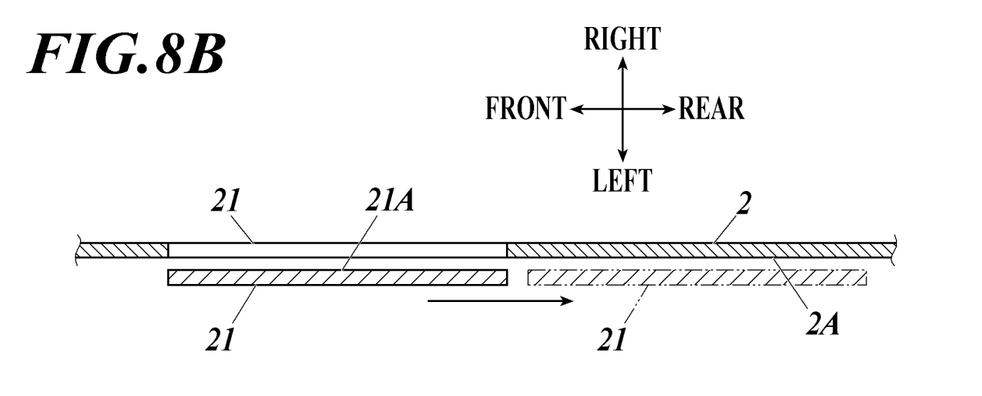
FIG. 8B shows the sliding door slid backward after the door is pulled outward from the lateral side of the fuselage.

If the space S is large enough, for example, the sliding door 21 is pulled outward from the lateral side of the fuselage 2 as shown in FIG. 8A. The sliding door 21 is slid backward as shown in FIG. 8b. Thus, the sliding door 21 is opened and closed by sliding the sliding door 2 while the outer side 2A of the fuselage 2 and the inner side 21A of the sliding door 21 face each other.

FIGS. 8A and 8b, as well as FIG. 9 and subsequent figures below, show a case where the left sliding door 21 is opened and closed. A similar configuration can be applied to a case where the right sliding door 21 is opened and closed.

On the other hand, in a case where the space S is not wide enough, especially in a case where the sliding door 21 could interfere with the folded main wing 4 when the sliding door 21 is pulled outward from the lateral side of the fuselage 2 as shown in FIG. 8A, for example, the opening/closing structure 10 of the sliding door 21 (hereinafter referred to as "sliding door opening/closing structure 10") may have the configuration shown in FIG. 9.

Figure 9:
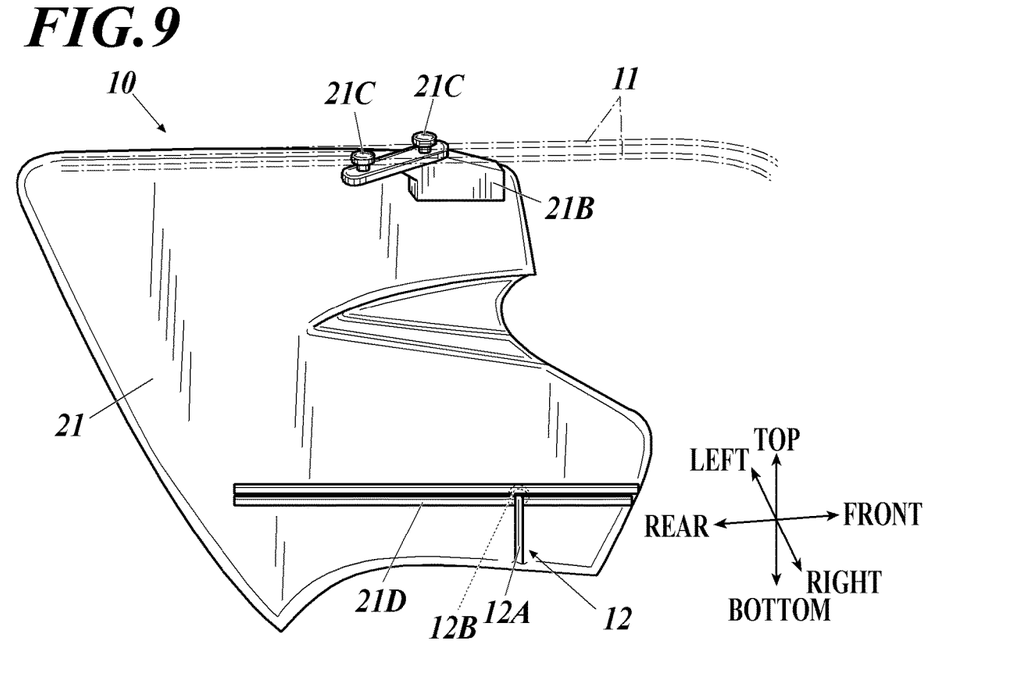
FIG. 9 shows a view of a sliding door opening/closing structure including a sliding door in a different form than that in FIGS. 8a and 8b, the view being seen from inside of the fuselage.

FIG. 9 shows the sliding door opening/closing structure 10, including the sliding door 21, viewed from inside the fuselage 2. This shows the sliding door opening/closing structure 10 viewed from the inside upper side of the fuselage 2 with eyes looking slightly downward. Except for the sliding door 21, rails 11, and a regulatory member 12 described below, components of the roadable aircraft 1 are omitted in FIG. 9.

In this case, the two rails 11 are arranged at a part of the fuselage 2 of the roadable aircraft 1, the part corresponding to the top edge of the sliding door 21. The rails 11 are arranged substantially in parallel to extend in the front-rear direction. The front ends of the rails 11 are curved toward the inside of the fuselage 2. The number of the rails 11 may be one, three, or more.

A guide roller holder 21B is fixed to the inner side of the upper edge of the sliding door 21. Guide rollers 21C are fixed to the upper side of the guide roller holder 21B. Each of the guide rollers 21C is slidably engaged with the corresponding rail 11.

Figure 10:
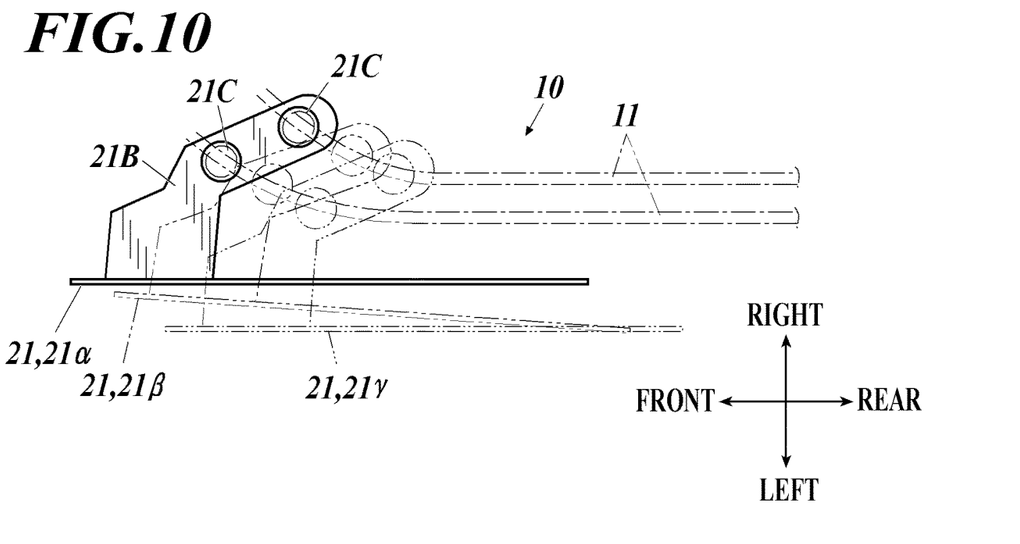

According to this configuration, as shown in FIG. 10, which shows the rails 11 and sliding door 21, etc. viewed from above, when the sliding door 21 in the closed state (see 21α in the figure) is slid backward to be opened, the rear end of the sliding door 21 moves outward by a predetermined amount while moving backward (see 21β in the figure).

When the sliding door 21 is slid further, the front end of the sliding door 21 moves outward by a predetermined amount while moving backward (see 21γ in the figure). Thereafter, the whole sliding door 21 slides in the sliding direction.

According to this configuration, at the beginning of opening of the sliding door 21, not the entire sliding door 21 moves outward as shown in FIG. 8A, but only the rear end moves outward first as indicated by 21β in FIG. 10. After that, the entire sliding door 21 moves backward, and then the front end of the sliding door 21 moves outward as indicated by 21γ in FIG. 10.

Therefore, when opening the sliding door 21, even if the folded main wing 4 is just outside of the sliding door 21, the sliding door 21 can be opened and closed while avoiding the main wing 2. The sliding door 21 can be opened and closed without interfering with the folded main wing 4.

In the case where the sliding door 21 is moved while suspended on the rails 11 as described above, the lower part of the sliding door 21 may swing from side to side.

Figure 11A:
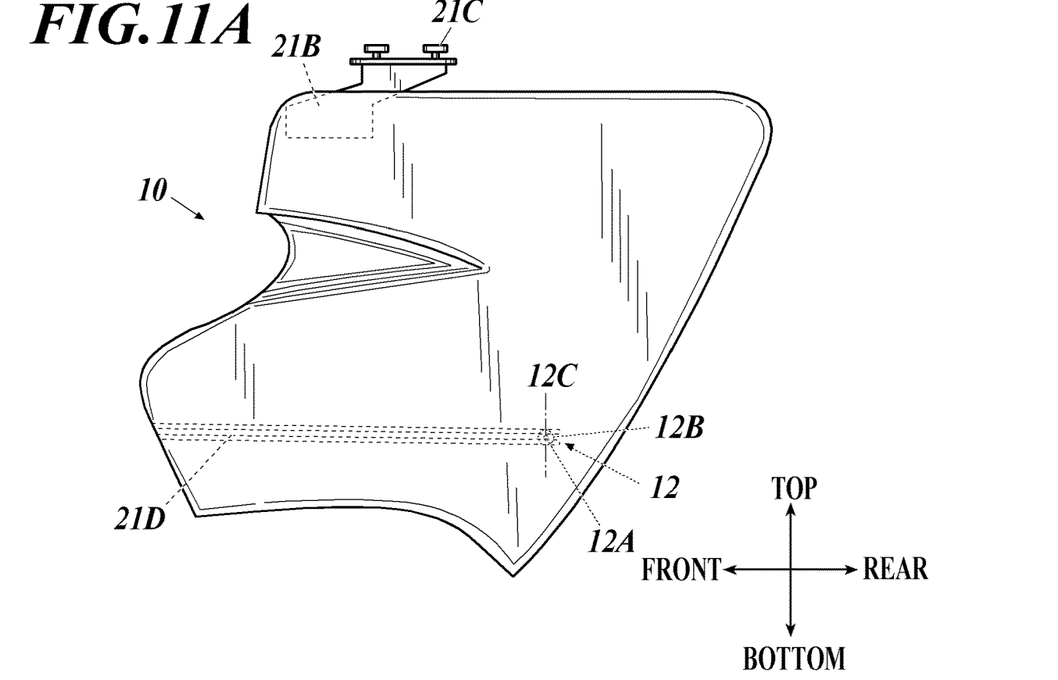
FIG. 11A shows the sliding door opening/closing structure in FIG. 9 viewed from the outside of the roadable aircraft.
Figure 11B:
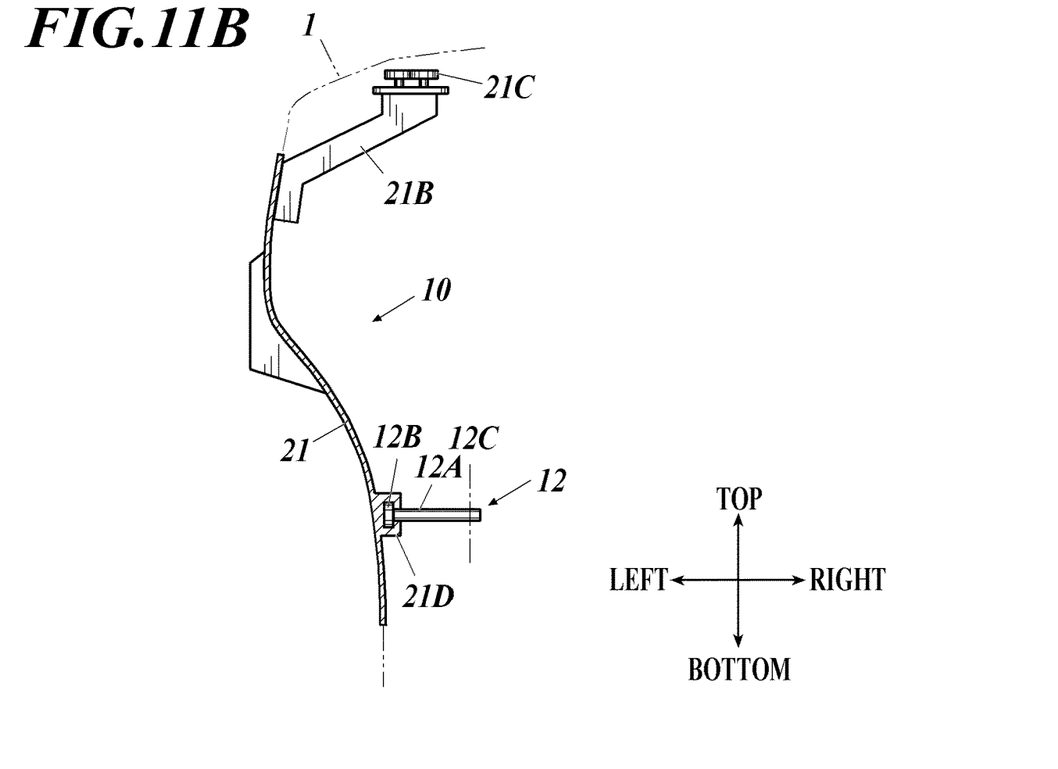
FIG. 11B shows the sliding door opening/closing structure in FIG. 9 viewed from behind the roadable aircraft.

So, for example, as shown in FIG. 9 and FIG. 11A, a door-side rail 21D extending in the sliding direction (forward/backward) of the sliding door 21 may be provided on the inner side of the sliding door 21. FIG. 11A shows the sliding door opening/closing structure 10 viewed from the outside of the roadable aircraft 1. FIG. 11B is a rear view. The rails 11 are omitted in FIGS. 11A and 11B.

As shown in FIGS. 9, 11A, and 11B, a groove is provided in the door-side rail 21D. The regulatory member 12 is positioned at a part of the fuselage 2 of the roadable aircraft 1, the part corresponding to the door-side rail 21D. The regulatory member 12 consists of a roller holder 12A and a roller 12B attached to the end of the roller holder 12A. The roller 12B of the regulatory member 12 is slidably engaged with the door-side rail 21D.

The roller holder 12A of the regulatory member 12 can swing around a swing axis 12C extending substantially in the vertical direction (see FIGS. 11A and 11B).

Figure 12:
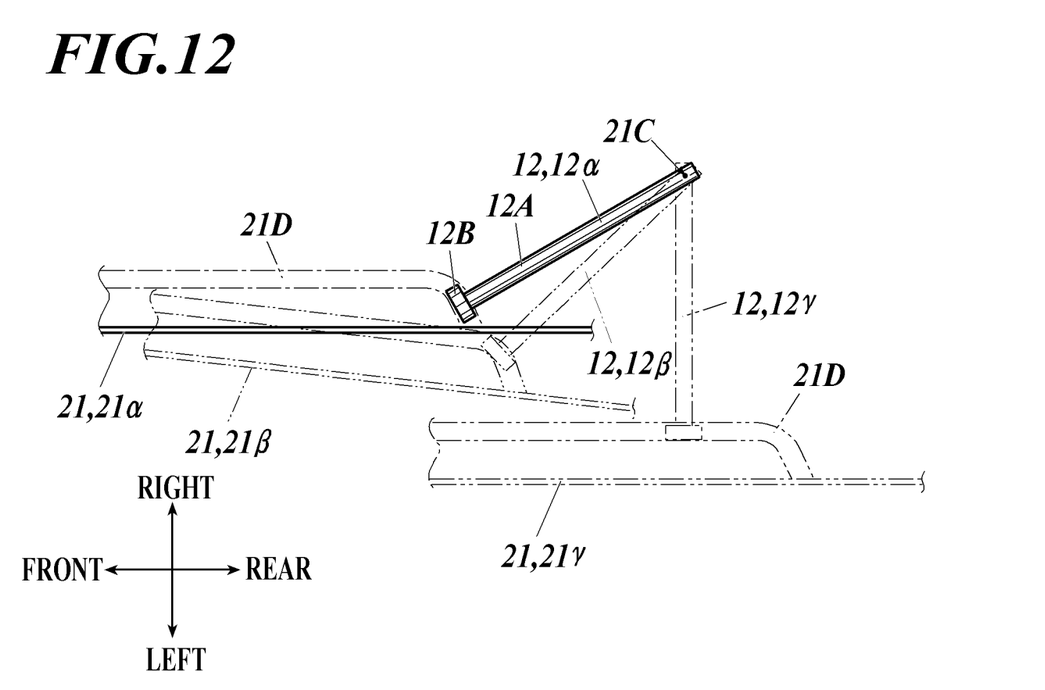
FIG. 12 is an enlarged view showing swing of a regulatory member and engagement of the regulatory member with the door-side rail while the sliding door is opened and closed.

According to this configuration, in a case where the sliding door 21 slides as shown in FIG. 10, the regulatory member 12 is in the state indicated by the sign 12α in FIG. 12 when the sliding door 21 is in the state indicated by the sign 21α in FIG. 10. Then, when the sliding door 21 comes to the state indicated by the signs 21β and 21γ in FIG. 10, the regulatory member 12 comes to the state indicated by the signs 12β and 12γ in FIG. 12. Thus, the regulatory member 12 swings around the swing axis 12C following movement of the sliding door 21.

Then, when the sliding door 21 is slid backward, the roller 12B of the regulatory member 12 moves along the door-side rail 21D while engaging with the door-side rail 21D.

Thus, while the sliding door 21 slides, movement of the lower part of the sliding door 21 in the right-left direction is restricted by the regulatory member 12.

Even in the case where the sliding door 21 is moved while being suspended on the rails 11 as described above, the lower part of the sliding door 21 is reliably prevented from swinging from side to side.

As described above, according to the embodiments of the roadable aircraft 1, the door of the roadable aircraft 1 is the sliding door 21. When the main wings 4 of the roadable aircraft 1 are folded beside the fuselage 2, the spaces S is formed between the main wing 4 and the fuselage 2. The sliding door 21 is slid open and closed within the space S.

Thus, the sliding door 21 can be opened and closed within the space S. The sliding door 21 can be opened and closed without interfering with the main wing 4.

When the driver opens and closes the sliding door 21 to get in and out of the roadable aircraft 1, the main wing 4, which is folded beside the fuselage 2, is prevented from hitting or scraping against the sliding door 21. The sliding door 21 and the main wing 4 are prevented from being damaged.

The present invention is not limited to the embodiments, and can be modified within the scope of the claims.

For example, in the embodiments, the propeller 5 is attached to the main wing 4, but the propeller 5 may be installed at the nose or elsewhere.

Instead of the propeller 5, a jet engine or the like may be mounted.

INDUSTRIAL APPLICABILITY

The invention can be used for roadable aircrafts.

REFERENCE SIGNS LIST

1 roadable aircraft
2 fuselage
2A outer side of fuselage
4 main Wing
5 propeller
6 horizontal stabilizer
21 sliding door
21A inner side of sliding door
22 hinge mechanism
42 winglet
S space

The invention claimed is:

1. A roadable aircraft, comprising:
   main wings;
   a fuselage;
   a sliding door on a lateral side of the fuselage; and
   hinge mechanisms which connect the main wings to the fuselage and which allow the main wings to turn between:
   a first state where the main wings are folded beside the fuselage; and
   a second state where the main wings are opened on lateral sides of the fuselage, wherein:
   fittings are respectively provided i) on the fuselage and ii) on an outer periphery of a winglet formed on an end of one of the main wings, and
   in the first state, 1) the end of the winglet is fixable to the fuselage using the fittings, and 2) the sliding door is opened and closed by sliding the sliding door in a space surrounded by the one of the main wings, the winglet, and the fuselage while an outer side of the fuselage and an inner side of the sliding door face each other.

2. The roadable aircraft according to claim 1, wherein:
   the main wings are tilt wings with propellers attached, and
   the hinge mechanisms rotate with respect to the fuselage to change a tilt angle of the tilt wings in the second state.

3. The roadable aircraft according to claim 1, wherein the fittings include a hook and a U-shaped metal fitting.

4. The roadable aircraft according to claim 1, further comprising:
   a rail arranged at a part of the fuselage, the part corresponding to a top edge of the sliding door, a front end of the rail being curved toward an inside of the fuselage.

* * * * *